United States Patent
Lin et al.

(10) Patent No.: US 9,478,975 B2
(45) Date of Patent: Oct. 25, 2016

(54) PROTECTION CIRCUIT AND RELATED METHOD

(71) Applicant: HON HAI PRECISION INDUSTRY CO., LTD., New Taipei (TW)

(72) Inventors: Ching-Chung Lin, New Taipei (TW); Pin-Hung Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/489,736

(22) Filed: Sep. 18, 2014

(65) Prior Publication Data

US 2015/0077892 A1    Mar. 19, 2015

(30) Foreign Application Priority Data

Sep. 18, 2013 (CN) .......................... 2013 1 0424511

(51) Int. Cl.
*H02H 9/00* (2006.01)
*H02H 9/04* (2006.01)
*H02M 1/32* (2007.01)

(52) U.S. Cl.
CPC ............... *H02H 9/001* (2013.01); *H02H 9/04* (2013.01); *H02M 1/32* (2013.01)

(58) Field of Classification Search
CPC ................. H02H 3/027; H02H 3/093; H02H 9/001–9/004; H02M 1/32
See application file for complete search history.

(56) References Cited

U.S. PATENT DOCUMENTS

| | | | | |
|---|---|---|---|---|
| 5,268,630 A * | 12/1993 | Bhagwat | ............... | H02J 7/0081 320/145 |
| 8,405,938 B2 * | 3/2013 | Lu | ........................... | H02M 1/32 361/18 |
| 8,467,156 B2 * | 6/2013 | Tsai | ........................ | H02M 1/32 361/18 |
| 9,112,345 B2 * | 8/2015 | Srinivas | ................. | H02H 9/002 |
| 2008/0232144 A1 * | 9/2008 | Klein | ...................... | H02M 1/36 363/49 |
| 2009/0143032 A1 * | 6/2009 | Ojanen | ................... | H02M 1/36 455/127.1 |
| 2011/0050298 A1 * | 3/2011 | Hu | ............................ | G06F 1/26 327/141 |
| 2011/0058285 A1 * | 3/2011 | Wibben | .................. | H02M 1/32 361/18 |
| 2011/0234192 A1 * | 9/2011 | Tong | .................. | G01R 31/2836 323/311 |
| 2012/0032591 A1 * | 2/2012 | Matsui | ................. | H05B 33/089 315/77 |
| 2013/0050880 A1 * | 2/2013 | Rozman | ................ | H02H 3/025 361/18 |
| 2013/0166947 A1 * | 6/2013 | Yang | ..................... | H02H 9/001 714/14 |

(Continued)

*Primary Examiner* — Stephen W Jackson
*Assistant Examiner* — Christopher Clark
(74) *Attorney, Agent, or Firm* — Zhigang Ma

(57) ABSTRACT

A protection circuit is connected between a power supply for providing a working voltage and a load. The protection circuit comprises an interface, a detecting module connected to the interface, a control module, and a switch module. The control module generates a plus width modulation (PWM) signal with a predetermined duty cycle when the interface interconnects with the load. The switch module periodically turns on and turns off based on the PWM signal with the predetermined duty cycle.

17 Claims, 4 Drawing Sheets

(56) References Cited

U.S. PATENT DOCUMENTS

| | | | | |
|---|---|---|---|---|
| 2013/0176652 A1* | 7/2013 | Kim | ................ | H02H 3/20 361/86 |
| 2014/0085756 A1* | 3/2014 | Lin | ................ | H02H 3/021 361/18 |
| 2014/0111899 A1* | 4/2014 | Lin | ................ | H02H 3/027 361/93.4 |
| 2014/0253072 A1* | 9/2014 | Hussien | ................ | H02M 1/36 323/281 |
| 2014/0253079 A1* | 9/2014 | Ding | ................ | H02M 3/156 323/283 |
| 2014/0268458 A1* | 9/2014 | Luciani | ................ | H02H 3/10 361/86 |
| 2014/0268464 A1* | 9/2014 | Dai | ................ | H02M 1/32 361/91.1 |
| 2014/0313626 A1* | 10/2014 | Wang | ................ | H02H 9/04 361/91.2 |
| 2015/0229124 A1* | 8/2015 | Kim | ................ | H02H 9/005 361/86 |
| 2015/0256060 A1* | 9/2015 | Faingersh | ................ | H02M 1/36 323/267 |

\* cited by examiner

US 9,478,975 B2

PROTECTION CIRCUIT AND RELATED METHOD

CROSS-REFERENCE TO RELATED APPLICATIONS

This application claims priority to Chinese Patent Application No. 201310424511.1 filed on Sep. 18, 2013, the contents of which are incorporated by reference herein.

FIELD

The present disclosure relates to protection circuits for protecting power supplies.

BACKGROUND

Electronic device, such as a computer or a television, is powered by an external power supply. Internal components in the electronic device can be damage by a surge current occurred in the power supply.

BRIEF DESCRIPTION OF THE FIGURES

Implementations of the present technology will now be described, by way of example only, with reference to the attached figures.

DETAILED DESCRIPTION

Figure 1:
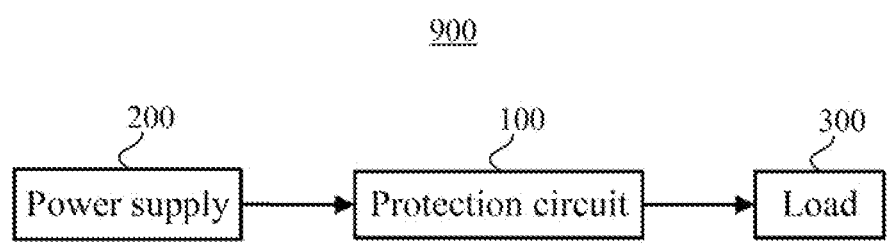
FIG. 1 is a block diagram of an embodiment of a protection system, the protection system comprising a protection circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In the present disclosure, "module," refers to logic embodied in hardware or firmware, or to a collection of software instructions, written in a program language. In one embodiment, the program language can be Java, C, or assembly.

One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

The term "comprising" means "including, but not necessarily limited to"; it specifically indicates open-ended inclusion or membership in a so-described combination, group, series and the like.

A protection system capable of preventing being damaged by a surge is described.

FIG. 1 illustrates an embodiment of a protection system 900. The protection system 900 includes a protection circuit 100, a power supply 200 for outputting a working voltage, and a load 300 working based on the working voltage.

The protection circuit 100 is connected between the power supply 200 and the load 300. In at least one embodiment, the power supply 200 is a power adapter, and the load 300 is a computer. The working voltage can be 12 volt (V) or 24V.

Figure 2:
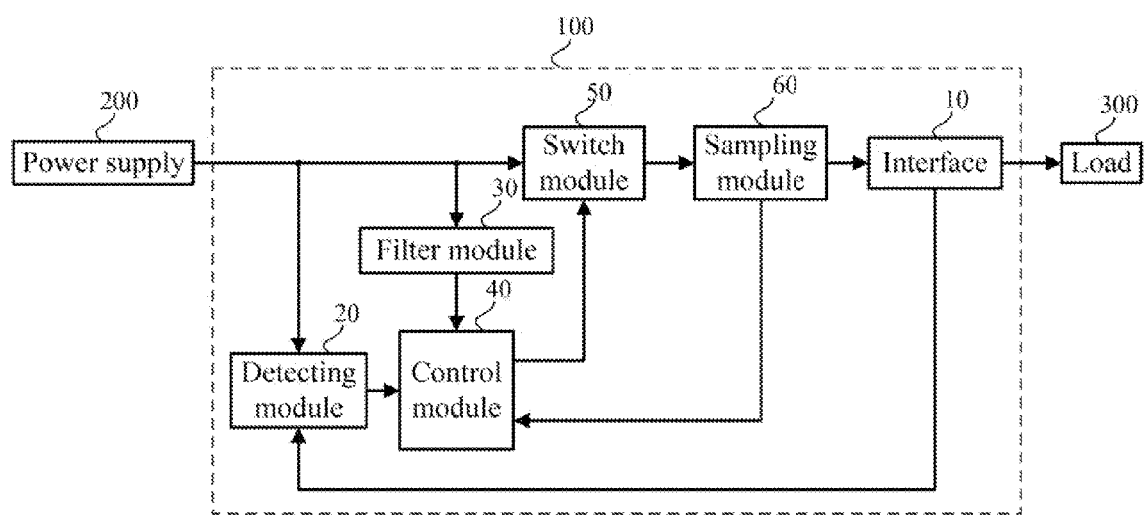
FIG. 2 is a block diagram of an embodiment of the protection circuit of FIG. 1.

FIG. 2 illustrates an embodiment of the protection circuit 100. The protection circuit 100 includes an interface 10, a detecting module 20, a filter module 30, a control module 40, a switch module 50, and a sampling module 60.

The interface 10 is capable of connecting to the load 300. In at least one embodiment, the load 300 is inserted into the interface 10 for connecting the protection circuit 100 with the load 300.

The detecting module 20 connects between the power supply 200 and the interface 10. The detecting module 20 further connects to the control module 40. The detecting module 20 generates a trigger signal when the interface 10 connects with the load 300, and stops generating the trigger signal when the interface 10 disconnects with the load 300.

The filter module 30 connects between the power supply 200 and the control module 40. The filter module 30 filters the working voltage outputted by the power supply 200.

The control module 40 connects between the filter module 30 and the switch module 50. The control module 40 generates a pulse width modulation (PWM) signal with a predetermined duty cycle in response to the trigger signal, and stops generating the predetermined PWM signal without receiving the trigger signal. In at least one embodiment, the predetermined duty cycle of the PWM signal is 5%.

The switch module 50 connects between the power supply 200 and the interface 10. The switch module 50 periodically turns on and turns off based on the PWM signal. The switch module 50 is in the turn-on state for connecting between the power supply 200 and the interface 10, and is in the turn-off state for disconnecting the power supply 200 and the interface 10.

The sampling module 60 connects between the switch module 50 and the interface 10. The sampling module 60 further connects to the control module 40.

The sampling module 60 samples the working voltage provided to the interface 10 to obtain a sampled voltage.

The control module 40 further adjusts the duty cycle of the PWM signal based on the sampled voltage. The control module 40 further includes a first predetermined time period, a second predetermined time period, a standard voltage, a plurality of reference voltage, and a plurality of duty cycles corresponding to the reference voltages in an one-to-one relationship. The control module 40 accumulates a sampling time when receiving the sampled voltage, and compares the sampling time with the first predetermined time period. In at least one embodiment, the control module 40 is a central processing unit (CPU). The reference voltages are 0.25V, 0.5V, 0.75V, 1V, 1.25V, 1.5V, 1.75V, 2V, 2.25V, and 2.5V. The corresponding duty cycles are 10%, 20%, 30%, 40%, 50%, 60%, 70%, 80%, 90%, and 100% in that order. The standard voltage is equal to the maximum reference voltage. When the current sampled voltage is equal to 0.25V, the duty cycle of the generated PWM signal is 10%. When the current sampled voltage is equal to 2.25V, the duty cycle of the generated PWM signal is 90%. When the current sampled voltage is equal to 2.5V, the duty cycle of the generated PWM signal is 100%.

When the sampling time is less than the first predetermined time period, the control module 40 determines whether the current sampled voltage is equal to the previous sampled voltage. When the current sampled voltage is equal to the previous sampled voltage, the control module 40 starts to accumulate a detecting time, and compares the detecting time with the second predetermined time period. When the detecting time is greater than the second predetermined time period, the control module 40 controls the switch module 50 to be turned-off continuously. When the detecting time is less than the second predetermined time period, the control module 40 continues comparing the current sampled voltage with the previous sampled voltage. When the current sampled voltage is not equal to the previous sampled voltage, the control module 40 further selects one of the reference voltages corresponding to the current sampled voltage and generates the PWM signal with a specified duty cycle corresponding to the selected reference voltage which is equal to the current sampled voltage.

When the sampling time is greater than the first predetermined time period, the control module 40 determines whether the current sampled voltage is equal to the standard voltage. When the current sampled voltage is equal to the standard voltage, the control module 40 controls the switch module 50 to be turned-on continuously. When the current sampled voltage is not equal to the standard voltage, the control module 40 controls the switch module 50 to be turned-off continuously.

Figure 3:
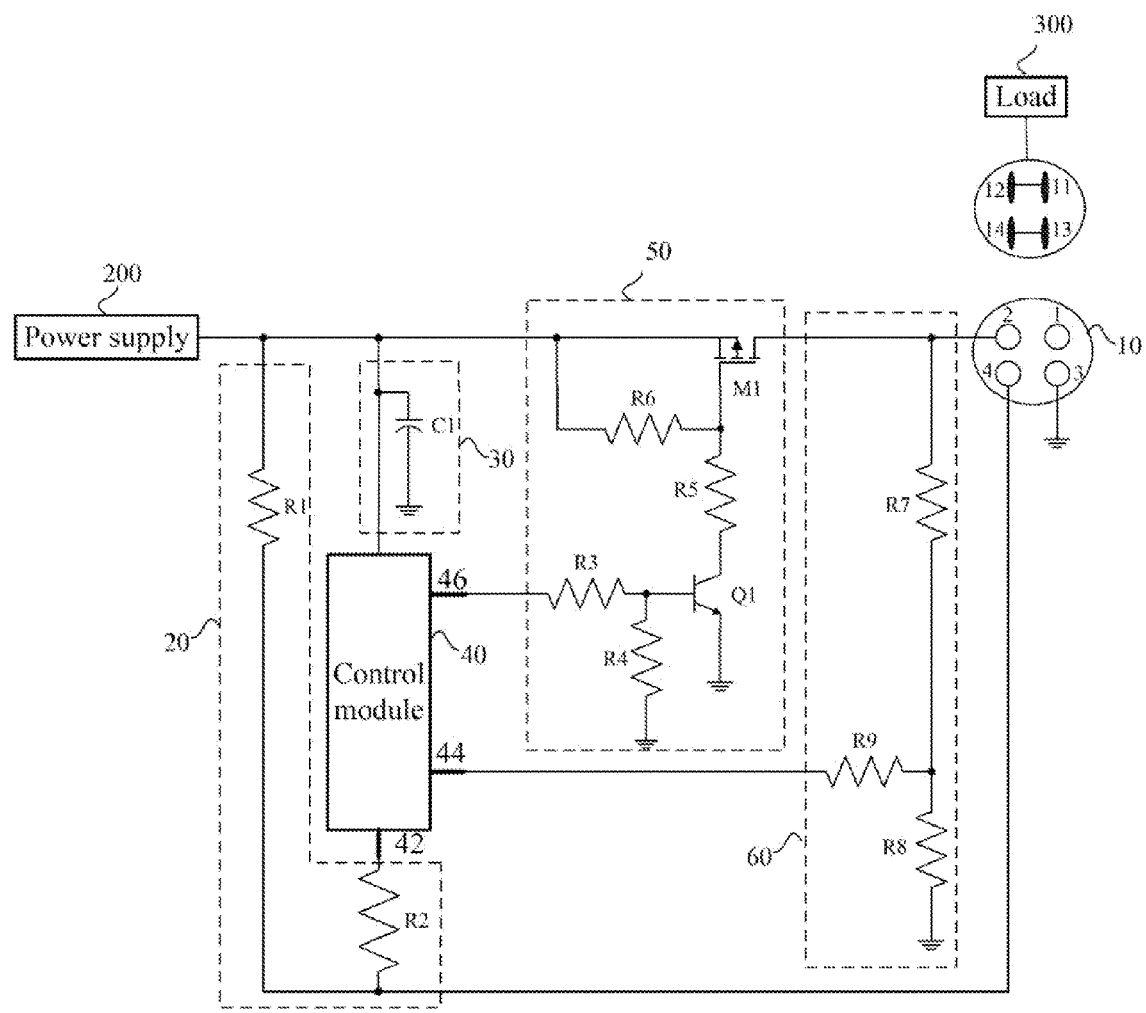
FIG. 3 is a circuit diagram of an embodiment of the protection circuit of FIG. 2.

FIG. 3 illustrates that the load 300 includes a first plug 11, a second plug 12 connected with the first plug 11, a third plug 13, and a fourth plug 14 connected with the third plug 13.

The interface 10 includes a first jack 1, a second jack 2, a third jack 3, and a fourth jack 4, which are made of conductive material, and insulates with each other. The second jack 2 is connected to the switch module 50. The third jack 3 is grounded. The fourth jack 4 is connected to the detecting module 20.

The detecting module 20 includes a first resistor R1 and a second resistor R2. The first resistor R2 is connected between the power supply 200 and the fourth jack 4. A terminal of the second resistor R2 is connected to the control module 40, another terminal of the second resistor R2 is connected between the first resistor R1 and the fourth jack 4.

The filter module 30 includes a capacitor C1. A terminal of the capacitor C1 is connected between the power supply 200 and the control module 40, and another terminal of the capacitor C1 is grounded.

The control module 40 includes a trigging pin 42, a connecting pin 44, and a controlling pin 46. The trigging pin 42 is connected to the second resistor R2. The connecting pin 44 is connected to the sampling module 60. The controlling pin 46 is connected to the switch module 50.

The switch module 50 includes a first transistor Q1, a second transistor M1, a third resistor R3, a fourth resistor R4, a fifth resistor R5, and a sixth resistor R6. A first electrode of the first transistor Q1 is connected to the controlling pin 46 through the third resistor R3. A second electrode of the first transistor Q1 is grounded. A third electrode of the first transistor Q1 is connected to a first electrode of the second transistor M1 through the fifth resistor R5. A second electrode of the second transistor M1 is connected to the power supply 200. A third electrode of the third transistor M1 is connected to the second jack 2. A terminal of the fourth resistor R4 is connected to the first electrode of the first transistor Q1, and another terminal of the fourth resistor R4 is grounded. The sixth resistor R6 is connected between the first electrode and the second electrode of the second transistor M1. In at least embodiment, the first transistor Q1 is an npn type bipolar junction transistor, and the second transistor M1 is p-channel enhancement type metal oxide semiconductor field effect transistor. The first electrode of the first transistor Q1 is a base electrode. The second electrode of the first transistor Q1 is an emitter electrode. The third electrode of the first transistor Q1 is a collector electrode. The first electrode of the second transistor M1 is a gate electrode. The second electrode of the second transistor M1 is a source electrode. The third electrode of the second transistor M1 is a drain electrode.

The sampling module 60 includes a first limiting resistor R7, a second limiting resistor R8, and a third limiting resistor R9. A terminal of the first limiting resistor R7 is connected between the third electrode of the second transistor M1 and the second jack 2, another terminal of the first limiting resistor R7 is grounded through the second limiting resistor R8. A terminal of the third resistor R9 is connected to the connecting pin 44, and another terminal of the third resistor R9 is connected between the first limiting resistor R7 and the second limiting resistor R8.

A protecting method of the protection circuit 300 is described as follow. When the load 300 is disconnected with the interface 10, the trigging pin 42 receives a high level voltage signal.

When the load 300 is interconnected with the interface 10, the first plug 11 is electrically connected with the first jack 1, the second plug 12 is electrically connected with the second jack 2, the third plug 13 is electrically connected with the third jack 3, and the fourth plug 14 is electrically connected with the fourth jack 4. The trigging pin 42 receives the trigger signal which is a low level voltage signal. The controlling pin 46 outputs the PWM signal with the predetermined duty cycle to the first electrode of the first transistor Q1, which causes the first transistor Q1 to periodically turn on and turn off. The connecting pin 44 receives the sampled voltage generated by the sampling module 60, and the control module 40 starts to accumulate the sampling time. When the sampling time is less than the first predetermined time period, the control module 40 determines whether the current sampled voltage is equal to the previous sampled voltage. When the current voltage is equal to the previous sampled voltage, the control module 40 starts to accumulate the detecting time and compares the detecting time with the second predetermined time period. When detecting time is greater than the second predetermined time period, the control module 40 controls the second transistor M1 to be turned-off continuously. When the detecting time is less than the second predetermined time period, the control module 40 continues receiving the sampled voltage and determines whether the current sampled voltage is equal to the previous sampled voltage.

When the current sampled voltage is not equal to the pervious sampled voltage, the control module 40 resets the detecting time and selects one of the reference voltages corresponding to the current sampled voltage. The controlling pin 46 generates the PWM signal with a specified duty cycle corresponding to the selected reference voltage which is equal to the current sampled voltage. For example, when the current sampled voltage is 1.25V which is not equal to the previous sampled voltage, and the controlling pin 46 generates the PWM signal with 50% duty cycle. As the sampled voltage becomes greater, the time of the second transistor M1 being turned-on becomes greater. The protection circuit 100 reduces the chance of a surge being provided to the load 300 while the load 300 interconnects with the power supply 200.

When the sampling time is greater than the first predetermined time period, the control module 40 detects whether the current sampled voltage is equal to the standard voltage. When the current sampled voltage is not equal to the standard voltage, the controlling pin 46 generates a first signal to turn-off the second transistor M1 continuously. When the current sample voltage is equal to the standard voltage, the load 300 is normal and the controlling pin 46 generates a second signal to turn-on the second transistor M1 continuously.

Figure 4:
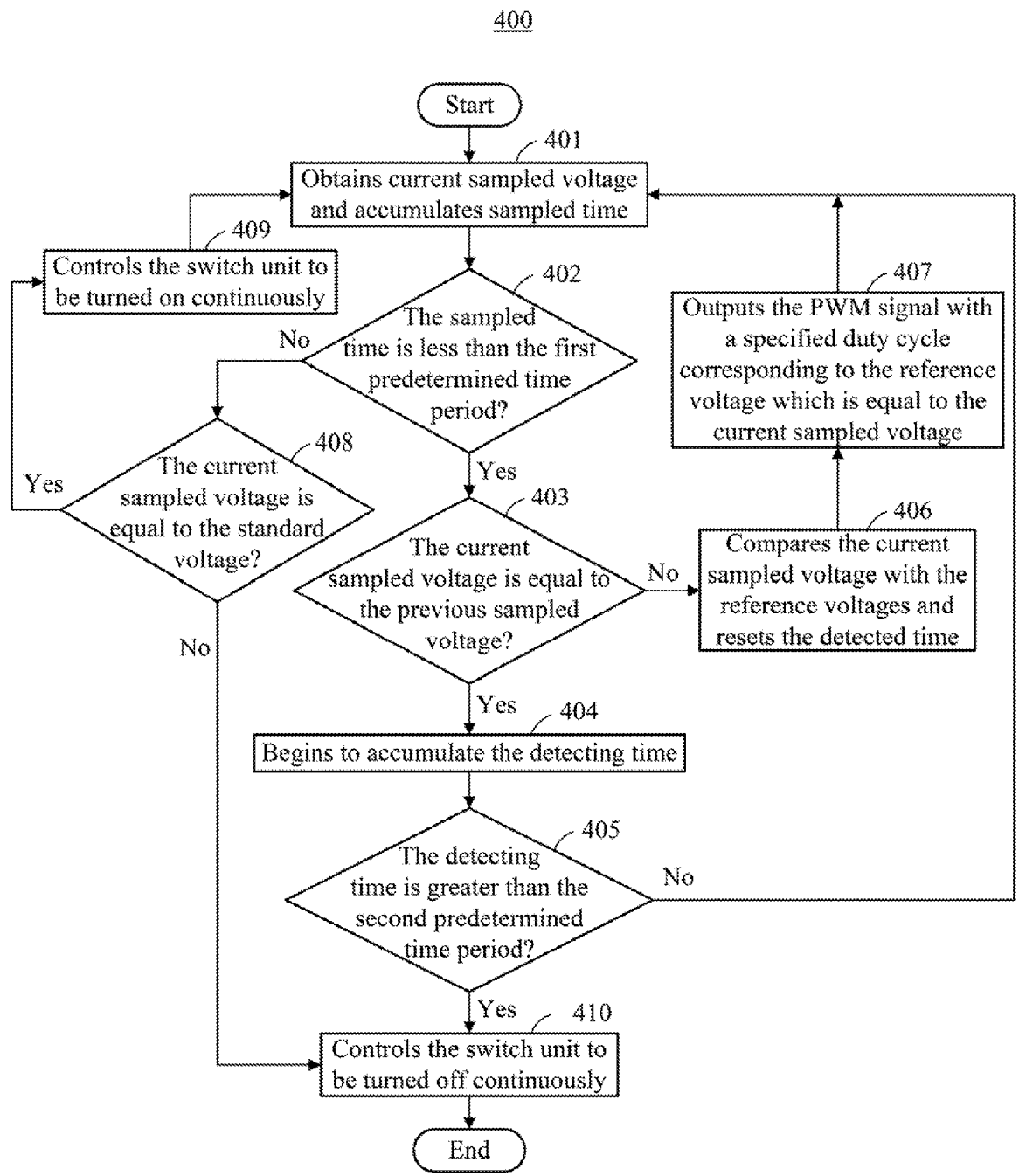
FIG. 4 is a flowchart of an embodiment of a protecting method.

FIG. 4 illustrates that a flowchart presented in accordance with an example embodiment. The method 400 is provided by way of example, as there are a variety of ways to carry out the method. The method 400 described below can be carried out using the configurations illustrated in FIG. 1, for example, and various elements of these figures are referenced in explaining the method 400. Each block shown in FIG. 4 represents one or more processes, methods, or subroutines carried out in the method 400. Furthermore, the order of blocks is illustrative only and the order of the blocks can change. Additional blocks can be added or blocks can be removed, without departing from this disclosure. The method 400 can begin at block 401.

At block 401, the control module 40 obtains a current sampled voltage and starts to accumulate the sampling time and the procedure goes to block 402.

At block 402, the control module 40 compares the sampling time with the first predetermined time period. If the sampling time is less than the first predetermined time period and the procedure goes to block 403. If the sampling time is greater than the first predetermined time period, and the procedure remains in block 408.

At block 403, the control module 40 determines whether the current sampled voltage is equal to the previous sampled voltage. If the current sampled voltage is equal to the previous sampled voltage, the produce goes to block 404. If the current sampled voltage is not equal to the previous sampled voltage, the produce goes to block 406.

At block 404, the control module 40 starts to accumulate the detecting time.

At block 405, the control module 40 compares the detecting time with the second predetermined time period. If the detecting time is greater than the second predetermined time period, the produce goes to block 410. If the detecting time is less than the second predetermined time period, the produce goes to block 401.

At block 406, the control module 40 resets the detecting time and selects one of the reference voltages corresponding to the current sampled voltage, and the produce goes to block 407.

At block 407, the control module 40 generates the PWM signal with a specified duty cycle corresponding to the selected reference voltage and the produce goes to block 401.

At block 408, the control module 40 determines whether the current sampled voltage is equal to the standard voltage. If the current sampled voltage is equal to the standard voltage, the produce goes to block 409. If the current sampled voltage is not equal to the standard voltage, the produce goes to block 410.

At block 409, the control module 40 controls the switch module 50 to be turned-on continuously, and the produce goes to block 401.

At block 410, the control module 40 controls the switch module 50 to be turned-off continuously.

In use, the protection circuit 100 reduces the chance of a surge being provided to the load 300 while the load 300 interconnects with the power supply 200, and protects the load 300.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A protection circuit connected between a power supply for providing a working voltage and a load, the protection circuit comprising:
    an interface capable of connecting and disconnecting with a load;
    a detecting module connected to the interface and configured to generate a trigger signal when the interface connects with the load;
    a control module connected to the detecting module and configured to generate a pulse width modulation (PWM) signal with a predetermined duty cycle in response to the trigger signal;
    a switch module connected to the power supply, the control module, and the interface; and
    a sampling module connected between the switch module and the interface;
    wherein the switch module periodically turns on and turns off based on the PWM signal generated by the control module; the sampling module samples the working voltage provided to the load; the control module presets a first predetermined time period and a second predetermined time period; the control module accumulates a sampling time when receiving the sampled voltage, and compares the sampling time with the first predetermined time period; when the sampling time is less than the first predetermined time period, the control module determines whether the current sampled voltage is equal to the previous sampled voltage; when the current sampled voltage is equal to the previous sampled voltage, the control module starts to accumulate a detecting time and compares the detecting time with the second predetermined time period; when the detecting time is greater than the second predetermined time period, the control module controls the switch module to be turned-off continuously.

2. The protection circuit of claim 1, wherein the control module further presets a plurality of reference voltages, and a plurality of duty cycles corresponding to the reference voltages in an one-to-one relationship; when the current sampled voltage is not equal to the previous sampled voltage, the control module further selects one of the reference voltages corresponding to the current sampled voltage and generates the PWM signal with a specified duty cycle corresponding to the selected reference voltage which is equal to the current sampled voltage.

3. The protection circuit of claim 2, wherein the control module further presets a standard voltage; when the sampling time is greater than the first predetermined time period, the control module determines whether the current sampled voltage is equal to the standard voltage; when the current sampled voltage is equal to the standard voltage, the control module controls the switch module to be turned-on continuously.

4. The protection circuit of claim 3, wherein when the current sampled voltage is not equal to the standard voltage, the control module controls the switch module to be turned-off continuously.

5. The protection circuit of claim 1, wherein the reference voltages increase gradually and the time of the switch module being turned-on becomes greater.

6. The protection circuit of claim 1, wherein the control module further resets the detecting time when the current sampled voltage is not equal to the previous sampled voltage.

7. The protection circuit of claim 1, wherein the switch module comprises a first transistor, a second transistor, a first resistor, a second resistor, a third resistor, and a fourth resistor; a first electrode of the first transistor is connected to the control module through the first resistor; a second electrode of the first transistor is grounded; a third electrode of the first transistor is connected to a first electrode of the second transistor through the third resistor; a second electrode of the second transistor is connected to the power supply; a third electrode of the second transistor is connected to the interface; a terminal of the second resistor is connected to the first electrode of the first transistor, and another terminal of the second resistor is grounded; the fourth resistor is connected between the first electrode and the second electrode of the second transistor.

8. A protecting method provided to a protection circuit connected between a power supply and a load, the protecting method comprising:
obtaining a current sampled voltage and starting to accumulate a sampling time;
comparing the sampling time with a first predetermined time period;
determining whether the current sampled voltage is equal to a previously sampled voltage when the sampling time is less than the first predetermined time period;
starting to accumulate a detecting time when the current sampled voltage is equal to the previous sampled voltage;
comparing the detecting time with a second predetermined time period; and
controlling the switch module to be turned-off continuously when the detecting time is greater than the second predetermined time period.

9. The protecting method of claim 8, further comprising:
selecting one of a plurality of reference voltages corresponding to the current sampled voltage when the current sampled voltage is not equal to the previous sampled voltage; and
generating a PWM signal with a specified duty cycle corresponding to the selected reference voltage.

10. The protecting method of claim 8, further comprising:
determining whether the current sampled voltage is equal to a standard voltage; and
controlling the switch module to be turned-on continuously when the current sampled voltage is equal to the standard voltage.

11. A protection circuit connected between a power supply for providing a working voltage and a load, the protection circuit comprising:
an interface capable of interconnecting with the load or disconnecting with the load;
a control module; and
a switch module connected to the power supply, the control module, and the interface; and
a sampling module connected between the switch module and the interface;
wherein the sampling module samples the working voltage provided to the load; the control module adjusts a time of the switch module being turned-on based on the sampled voltage; the control module presets a first predetermined time period, a plurality of reference voltages, and a plurality of duty cycles corresponding to the reference voltages in an one-to-one relationship; the control module accumulates a sampling time when receiving the sampled voltage and compares the sampling time with the first predetermined time period; when the sampling time is less than the first predetermined time period, the control module determines whether the current sampled voltage is equal to the previous sampled voltage; when the current sampled voltage is not equal to the previous sampled voltage, the control module further selects one of the reference voltages corresponding to the current sampled voltage and generates the PWM signal with a specified duty cycle corresponding to the selected reference voltage which is equal to the current sampled voltage.

12. The protection circuit of claim 11, further comprising a detecting module connected to the interface and the control module; wherein the detecting module generates a trigger signal to the control module when the interface interconnects with the load, the control module generates a pulse width modulation (PWM) signal with a predetermined duty cycle according to the trigger signal; the switch module periodically turns on and turns off based on the PWM signal with the predetermined duty cycle, the control module further adjusts the duty cycle of the PWM signal.

13. The protection circuit of claim 11, wherein the control module presets a second predetermined time period when the current sampled voltage is equal to the previous sampled voltage, the control module starts to accumulate a detecting time and compares the detecting time with the second predetermined time period; when the detecting time is greater than the second predetermined time period, the control module controls the switch module to be turned-off continuously.

14. The protection circuit of claim 11, wherein the control module further presets a standard voltage; when the sampling time is greater than the first predetermined time period, the control module determines whether the current sampled voltage is equal to the standard voltage; when the current sampled voltage is equal to the standard voltage, the control module controls the switch module to be turned-on continuously.

15. The protection circuit of claim 14, wherein when the current sampled voltage is not equal to the standard voltage, the control module controls the switch module to be turned-off continuously.

16. The protection circuit of claim 13, wherein the reference voltages increase gradually and the time of the switch module being turned-on becomes greater.

17. The protection circuit of claim 13, wherein the control module further resets the detecting time when the current sampled voltage is not equal to the previous sampled voltage.

\* \* \* \* \*